(12) United States Patent
Wang et al.

(10) Patent No.: US 11,965,604 B2
(45) Date of Patent: Apr. 23, 2024

(54) SYNCHRONOUS SWITCH VALVE CORE WITH VOLTAGE STABILIZING FUNCTION

(71) Applicant: HUIDA SANITARY WARE CO., LTD., Tangshan (CN)

(72) Inventors: Yanqing Wang, Tangshan (CN); Cuijie Wang, Tangshan (CN); Zichun Song, Tangshan (CN)

(73) Assignee: HUIDA SANITARY WARE CO., LTD., Tangshan (CN)

( * ) Notice: Subject to any disclaimer, the term of this patent is extended or adjusted under 35 U.S.C. 154(b) by 171 days.

(21) Appl. No.: 17/790,107

(22) PCT Filed: Dec. 25, 2020

(86) PCT No.: PCT/CN2020/139587
§ 371 (c)(1),
(2) Date: Jun. 29, 2022

(87) PCT Pub. No.: WO2021/139541
PCT Pub. Date: Jul. 15, 2021

(65) Prior Publication Data
US 2023/0052109 A1    Feb. 16, 2023

(30) Foreign Application Priority Data

Jan. 7, 2020 (CN) .......................... 202010011911.X (51) Int. Cl.
*F16K 17/26* (2006.01)
*F16K 11/00* (2006.01)
(Continued)

(52) U.S. Cl.
CPC .......... *F16K 17/26* (2013.01); *F16K 11/0743* (2013.01); *F16K 39/045* (2013.01); *F16K 19/006* (2013.01); *Y10T 137/2514* (2015.04)

(58) Field of Classification Search
CPC ........ Y10T 137/2514; Y10T 137/2521; G05D 23/1313
See application file for complete search history.

(56) References Cited

U.S. PATENT DOCUMENTS

| 6,176,250 B1 | 1/2001 | Lin et al. |
| 7,363,934 B1 * | 4/2008 | Lin ...................... G05D 23/136 137/98 |

(Continued)

FOREIGN PATENT DOCUMENTS

| AU | 2004233506 A1 | 6/2006 |
| CN | 203686241 U | 7/2014 |

(Continued)

OTHER PUBLICATIONS

European search report, Application No. 20912551.7-1015, dated Dec. 7, 2022 (5 pages).

(Continued)

*Primary Examiner* — Robert K Arundale (57) ABSTRACT

A synchronous switch valve core with a voltage stabilizing function, comprising: a valve core housing (1), a valve core base (2), a flow regulating module, and a balancing hydraulic module. The flow regulating module is capable of cutting off a cold/hot water path before water enters a pressure balancing module, thus preventing high-temperature water from immersing the valve core, preventing the building of lime scale, protecting the valve core, and extending the service life; moreover, water flow can enter the pressure balancing module only after flowing through the flow regulating module, thus preventing the channeling of hot and cold, and obviating the need to install a check valve at a water intake elbow. By means of an optimized design with respect to the parts of the synchronous switch valve core, the synchronous valve core is transformed from a switch capable only of regulating flow into a switch not only (Continued)

capable of regulating flow but also capable of synchronized switching, and also capable of balancing the pressures within two channels, thus transforming a product equipped with the vale core from a complex channel into a simple channel, and obviating the need for separately providing a balancing module part; a valve body is structurally simple, has a shortened water path, and is inexpensive.

3 Claims, 6 Drawing Sheets (51) Int. Cl.
*F16K 11/074* (2006.01)
*F16K 39/04* (2006.01)

(56) References Cited

U.S. PATENT DOCUMENTS

| | | |
|---|---|---|
| 8,707,995 B2 | 4/2014 | Yan |
| 10,228,710 B2 | 3/2019 | Yang |
| 2002/0144729 A1* | 10/2002 | Chang .................. G05D 23/136 137/119.04 |
| 2002/0179144 A1* | 12/2002 | Dempsey .............. F16K 19/003 137/98 |
| 2003/0183275 A1* | 10/2003 | Yang .................. G05D 23/1313 137/98 |
| 2010/0058534 A1 | 3/2010 | Martin |
| 2018/0275695 A1* | 9/2018 | Chang .................... F16K 11/00 |

FOREIGN PATENT DOCUMENTS

| | | |
|---|---|---|
| CN | 204878860 U | 12/2015 |
| CN | 205155324 U | 4/2016 |
| EP | 2202603 B1 | 6/2010 |
| WO | 2010016091 A1 | 2/2010 |

OTHER PUBLICATIONS

International Search Report issued in corresponding International application No. PCT/CN2020/139587, dated Mar. 8, 2021.
Written Opinion of the International Searching Authority for No. PCT/CN2020/139587.
Initial Publication For PCT/CN2020/139587.

* cited by examiner

SYNCHRONOUS SWITCH VALVE CORE WITH VOLTAGE STABILIZING FUNCTION

CROSS-REFERENCE TO RELATED APPLICATIONS

This application is a United States National Stage of International Application No. PCT/CN2020/139587, filed Dec. 25, 2020, which claims the benefit of priority of Chinese Patent Application Serial No. CN202010011911.X, filed on Jan. 7, 2020, the disclosure of all of which are hereby incorporated by reference in their entirety.

FIELD

The present invention relates generally to bathroom equipment, in particular to a synchronous switch valve core with voltage stabilizing function.

BACKGROUND

Along with the development of society, people have higher and higher requirements on life. An existing valve can only perform switching and flow regulation on a passage, and after the valve is assembled on a main body, a pressure balance module needs to be additionally arranged to balance pressure; in the main body without a synchronous switch, a one-way check valve is normally installed at the front ends of two passage ports to prevent the problem of mutual connection of the two passages. The one-way check valve needs to be arranged at the foremost end of a product pipeline, so that the volume of components is required to be small, and the water outlet needs to be tightly sealed. The one-way check valve has the defects that it is easy to be blocked by impurities and not sealed tightly, and has the flow resistance which greatly influences the internal flow, and short service life, and the like in practical application.

SUMMARY

The technical problem to be solved by the present invention is to overcome the defects in the prior art and provide a synchronous switch valve core with voltage stabilizing function.

The present invention is realized by the following technical solutions.

A synchronous switch valve core with voltage stabilizing function comprises a valve core housing, a valve core base, a flow adjusting module and a balancing hydraulic module, wherein the valve core housing is clamped with the valve core base to form a valve core cavity, the flow regulating module and the balancing hydraulic module are coaxially arranged in the valve core cavity, and water flows into the valve core cavity from one end of the valve core cavity and enters the balancing hydraulic module after passing through the flow regulating module; and a bottom water outlet and two water inlets are formed in one end, close to the water entering, of the valve core base, and an upper water outlet is formed in one side wall, far away from an end of the water entering, of the valve core housing; two water flow passages are formed in the valve core, one water flow passage is a communication of the water inlet, the flow regulating module, the balancing hydraulic module and the upper water outlet, and the other water flow passage is a communication of the other water inlet, the flow regulating module, the balancing hydraulic module and the bottom water outlet. The flow regulating module firstly switches and controls in flow the passage, then enters the pressure balance module to balance and control the pressure in the channel under the action of the pressure balance module; the flow regulating module can cut off a cold and hot water path before water enters the pressure balancing module, thus preventing high-temperature water from immersing the valve core, preventing the building of lime scale, protecting the valve core, and extending the service life; moreover, water flow can enter the pressure balancing module only after flowing through the flow regulating module, thus preventing the channeling of hot and cold water, and obviating the need to install a check value at a water intake elbow, so that the valve body waterway is simplified and the installation cost is reduced; and the pressure difference of the cold and hot water inletting through the traditional valve core is 3:1 after testing, and the pressure difference of the cold and hot water inletting can reach 20:1 after the valve core of the invention is adjusted in pressure by the pressure balance module.

Preferably, the valve core base is provided with a bottom water outlet and two water inlets, and the side wall of the valve core housing is provided with two upper water outlets.

The balancing hydraulic module is arranged in the flow regulating module, a first waterway and a second waterway are arranged in the flow regulating module, and the first waterway and the second waterway are respectively communicated with two water inlets; the balancing hydraulic module comprises a static balance sheet and a dynamic balance sheet, the static balance sheet is hermetically connected with the inner cavity of the flow regulating module, and the dynamic balance sheet is hermetically and slidably connected with the inner wall of the static balance sheet; the middle part of the dynamic balance sheet is fixedly connected with a baffle plate which divides the inner cavity of the dynamic balance sheet into an upper cavity body and a lower cavity, the upper cavity body is communicated with the upper water outlet, and the lower cavity body is communicated with the bottom water outlet; the side wall of the upper cavity body is provided with an upper water passing hole, the side wall of the lower cavity is provided with a lower water passing hole, and the static balance sheet is respectively provided with a through hole which enables the upper water passing hole to be communicated with the first waterway and the lower water passing hole to be communicated with the second waterway; the outer wall of the through hole communicated with the first waterway and the outer wall of the upper water passing hole are mutually shielded to form an upper flow passing channel; and the outer wall of the through hole communicated with the second waterway and the outer wall of the lower water passing hole are mutually shielded to form a lower flow passing channel, and the dynamic balance sheet moves up and down in the static balance sheet to change the water passing areas of the upper flow passing channel and the lower flow passing channel. Two paths for liquid to flow are formed in the valve core, one path includes a first waterway, an upper cavity body, and an upper water outlet, the other path includes a second water path, a lower cavity body, and a bottom water outlet; when liquid flows through the two paths, the pressure of the liquid generates certain stress on the baffle plate in the middle of the dynamic balance sheet; when the liquid pressure in the two paths is the same, the baffle plate is positioned right in the middle of the balancing hydraulic module, and the water passing areas of the upper flow passing channel and the lower flow passing channel are the same at the moment; and when the pressure of the liquid in the two paths is different, the stress of the liquid on the baffle plate in one path with large flow rate is greater than the stress of the liquid on the baffle plate in one path with low flow rate, so that the baffle plate can be pushed to move the dynamic balance sheet to one end with the low flow rate, and the water passing area in one path with the large flow rate is reduced, and the water passing area in one path with the low flow rate is increased until the liquid pressure in the two paths is re-balanced.

Preferably, the flow regulating module comprises a valve rod, a water pressure cavity housing, an upper switch seal and a lower switch seal, the upper end of the valve rod passes through the upper end of the valve core housing, the valve rod is detachably connected with the upper end of a water pressure cavity housing, and the side wall of the valve rod is provided with a through hole enabling the upper water passing hole to be communicated with the upper water outlet; a boss is arranged on the valve core base, and the middle part of the boss is communicated with the bottom water outlet, and the upper switch seal and the lower switch seal are sleeved on the boss from top to bottom; the upper switch seal is clamped with the water pressure cavity housing, the lower switch seal is clamped with the valve core base, and the upper switch seal and the lower switch seal are respectively provided with two liquid inlet holes symmetrically arranged. The valve rod is rotated to drive the water pressure cavity housing and the upper switch seal clamped with the water pressure cavity housing; a dislocation occurs between the upper switch seal and the lower switch seal, which can change the overlapping area between the liquid inlet holes at the corresponding sides of the upper switch seal and the lower switch seal, namely the water passing area between the upper switch seal and the lower switch seal, and adjustment or switching of the liquid flow is realized; a first channel and a second channel are arranged in the water pressure cavity housing, and the first channel and the second channel are respectively communicated with two liquid inlet holes on the upper switch seal; and the first channel, and the liquid inlet holes in the upper switch seal and the lower switch seal communicated with the first channel form a first waterway, the second channel and the liquid inlet holes in the upper switch seal and the lower switch seal communicated with the second channel form a second waterway, and the two water waterways are mutually isolated.

The present invention has the following beneficial effects.

The flow regulating module is capable of cutting off a cold/hot water path before water enters the pressure balancing module, thus preventing high-temperature water from immersing the valve core, preventing the building of lime scale, protecting the valve core, and extending the service life. Moreover, water flow can enter the pressure balancing module only after flowing through the flow regulating module, thus preventing the channeling of hot and cold water, and obviating the need to install a check value at a water intake elbow. By means of an optimized design with respect to the parts of the synchronous switch valve core, the synchronous value core is transformed from a switch capable only of regulating flow into a switch not only capable of regulating flow but also capable of synchronized switching, and also capable of balancing the pressures within two channels, thus transforming a product equipped with the value core from a complex channel into a simple channel, and obviating the need for separately providing a balancing module part; a value body is structurally simple, has a shortened water path, and is inexpensive.

BRIEF DESCRIPTION OF THE DRAWINGS

In order to explain the embodiments of the present invention or the technical solutions in the prior art more clearly, the following will briefly introduce the drawings that need to be used in the description of the embodiments or the prior art. Obviously, the drawings in the following description are only some embodiments of the present invention. For those of ordinary skill in the art, other drawings can be obtained based on these drawings without creative work.

In the drawings: 1. a valve core housing; 2. a valve core base; 3. a bottom water outlet; 4. a water inlet; 5. an upper water outlet; 6. a static balance sheet; 7. a dynamic balance sheet; 71. a dynamic balance sheet inner cavity; 8. an upper cavity body; 9. a lower cavity body; 10. a baffle plate; 11. an upper water passing hole, 12. a lower water passing hole; 13. a through hole; 14. a valve rod; 15. a water pressure cavity housing; 16. an upper switch seal; 17. a lower switch seal; 18. a boss; 19. a liquid inlet hole; 20. a first channel; 21. a second channel; 22. a sealing gasket; 23. a sealing ring; 24. a first opening gap; 25. a second opening gap; and 120. a valve core cavity.

DETAILED DESCRIPTION

In order that those skilled in the art may better understand the technical solutions of the present invention, the present invention will be described in further detail with reference to the accompanying drawings and preferred embodiments.

As shown in FIGS. 1-5, the present invention comprises a valve core housing 1, a valve core base 2, a flow adjusting module and a balancing hydraulic module, wherein the valve core housing 1 is clamped with the valve core base 2 to form a valve core cavity 120, the flow regulating module and the balancing hydraulic module are coaxially arranged in the valve core cavity 120, and water flows into the valve core cavity 120 from one end of the valve core cavity 120 and enters the balancing hydraulic module after passing through the flow regulating module; and a bottom water outlet 3 and two water inlets 4 are formed in one end, close to the water entering, of the valve core base 2, and an upper water outlet 5 is formed in one side wall, far away from an end of the water entering, of the valve core housing 1; two water flow passages are formed in the valve core, one water flow passage is a communication of the water inlet 4, the flow regulating module, the balancing hydraulic module and the upper water outlet 5, and the other water flow passage is a communication of the other water inlet 4, the flow regulating module, the balancing hydraulic module and the bottom water outlet 3; the flow regulating module firstly switches and controls in flow the passage, then enters the pressure balance module to balance and control the pressure in the channel under the action of the pressure balance module; the flow regulating module can cut off a cold and hot water path before water enters the pressure balance module, so that high-temperature water cannot immerse the valve core to prevent scale generation and protect the valve core, and the service life of the valve core is prolonged; meanwhile, water flow can enter the pressure balance module only after passing through the flow regulating module, cold and hot water channeling can be prevented, and a one-way valve does not need to be installed at the water inlet corner, so that the valve body waterway is simplified and the installation cost is reduced; and the pressure difference of the cold and hot water inletting through the traditional valve core is 3:1 after testing, and the pressure difference of the cold and hot water inletting can reach 20:1 after the valve core of the invention is adjusted in pressure by the pressure balance module.

Preferably, as shown in FIGS. 1-5, the balancing hydraulic module is arranged in the flow regulating module, a first waterway and a second waterway are arranged in the flow regulating module, and the first waterway and the second waterway are respectively communicated with two water inlets 4; the balancing hydraulic module comprises a static balance sheet 6 and a dynamic balance sheet 7, the static balance sheet 6 is hermetically connected with the inner cavity of the flow regulating module, and the dynamic balance sheet 7 is hermetically and slidably connected with the inner wall of the static balance sheet 6; the middle part of the dynamic balance sheet 7 is fixedly connected with a baffle plate 10 which divides the inner cavity 71 of the dynamic balance sheet into an upper cavity body 8 and a lower cavity 9, the upper cavity body 8 is communicated with the upper water outlet 5, and the lower cavity body 9 is communicated with the bottom water outlet 3; the side wall of the upper cavity body 8 is provided with an upper water passing hole 11, the side wall of the lower cavity 9 is provided with a lower water passing hole 12, and the static balance sheet 6 is respectively provided with a through hole 13 which enables the upper water passing hole 11 to be communicated with the first waterway and the lower water passing hole 12 to be communicated with the second waterway; the outer wall of the through hole 13 communicated with the first waterway and the outer wall of the upper water passing hole 11 are mutually shielded to form an upper flow passing channel; and the outer wall of the through hole 13 communicated with the second waterway and the outer wall of the lower water passing hole 12 are mutually shielded to form a lower flow passing channel, and the dynamic balance sheet 7 moves up and down in the static balance sheet 6 to change the water passing areas of the upper flow passing channel and the lower flow passing channel. Two paths for liquid to flow are formed in the valve core, one path includes a first waterway, an upper cavity body 8, and an upper water outlet 5, the other path includes a second water path, a lower cavity body 9, and a bottom water outlet 3; when liquid flows through the two paths, the pressure of the liquid generates certain stress on the baffle plate in the middle of the dynamic balance sheet 7; when the liquid pressure in the two paths is the same, the baffle plate 10 is positioned right in the middle of the balancing hydraulic module, and the water passing areas of the upper flow passing channel and the lower flow passing channel are the same at the moment; and when the pressure of the liquid in the two paths is different, the stress of the liquid on the baffle plate 10 in one path with large flow rate is greater than the stress of the liquid on the baffle plate 10 in one path with low flow rate, so that the baffle plate can be pushed to move the dynamic balance sheet to one end with the low flow rate, and the water passing area in one path with the large flow rate is reduced, and the water passing area in one path with the low flow rate is increased until the liquid pressure in the two paths is re-balanced.

Figure 1:
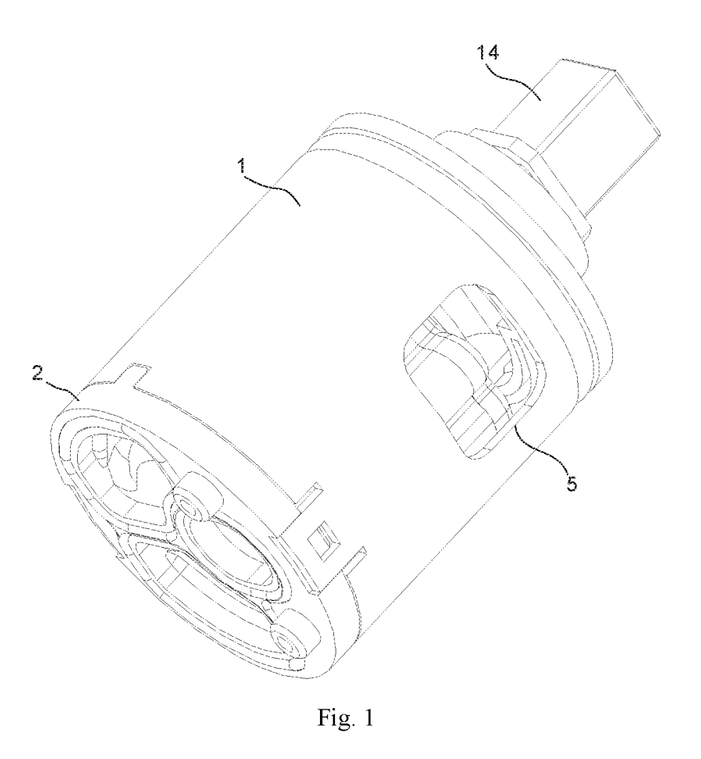
FIG. 1 is a perspective view showing a synchronous switch value core according to an embodiment.
Figure 2:
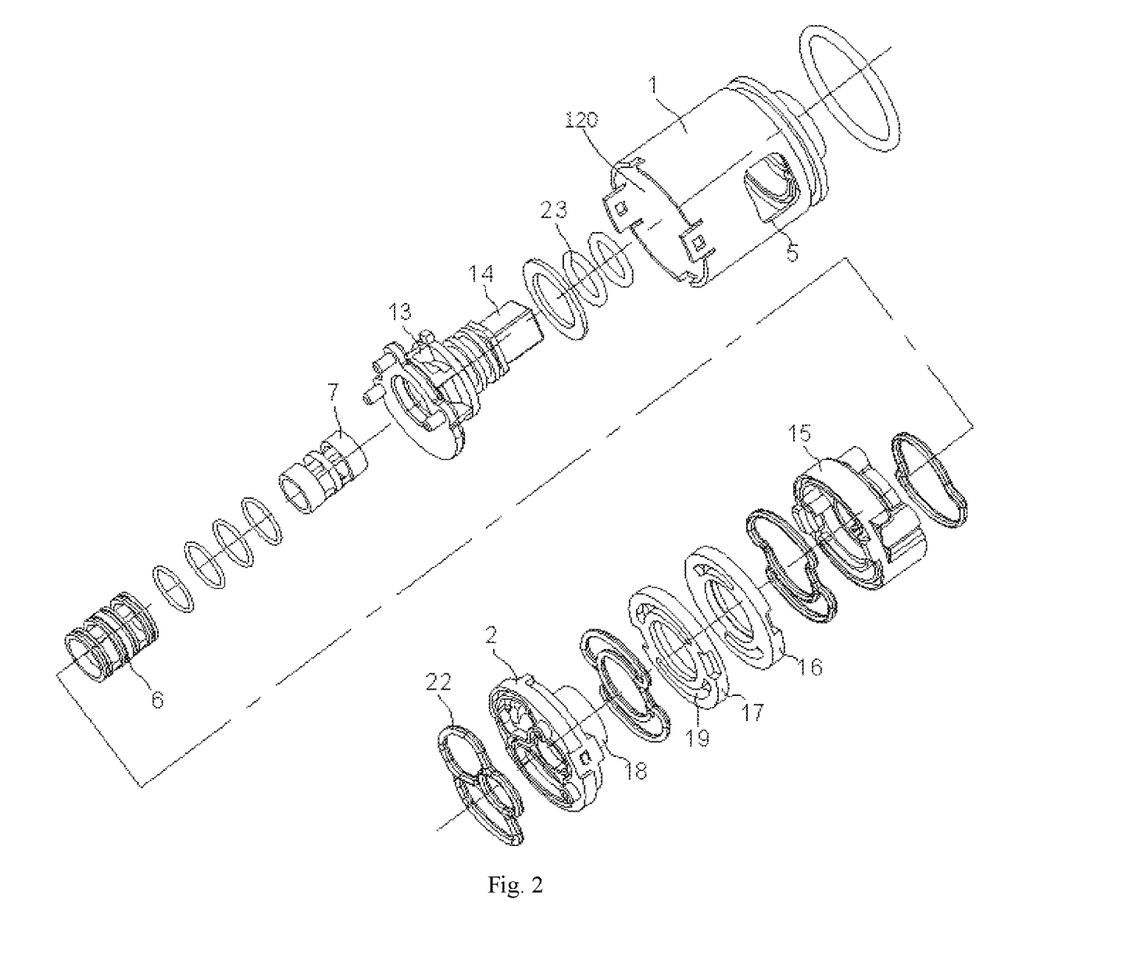
FIG. 2 is an assembly structure view showing a synchronous switch value core according to an embodiment.
Figure 3:
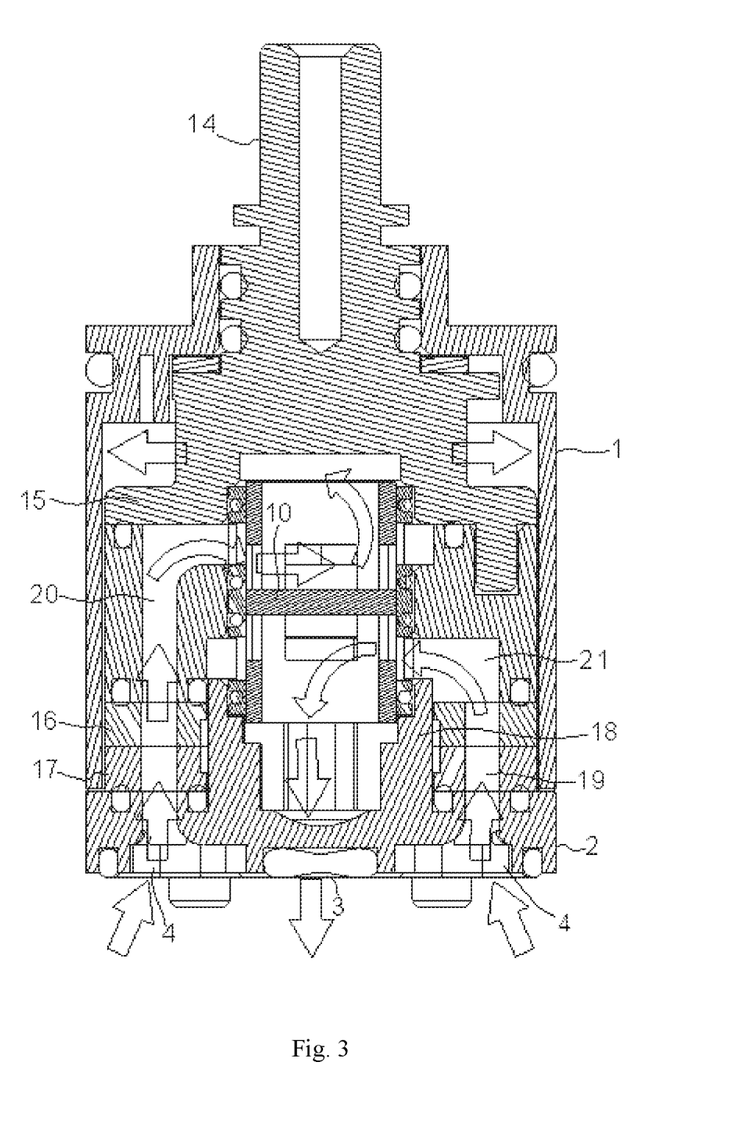
FIG. 3 is a cross-sectional structure view showing a synchronous switch value core according to an embodiment.
Figure 4:
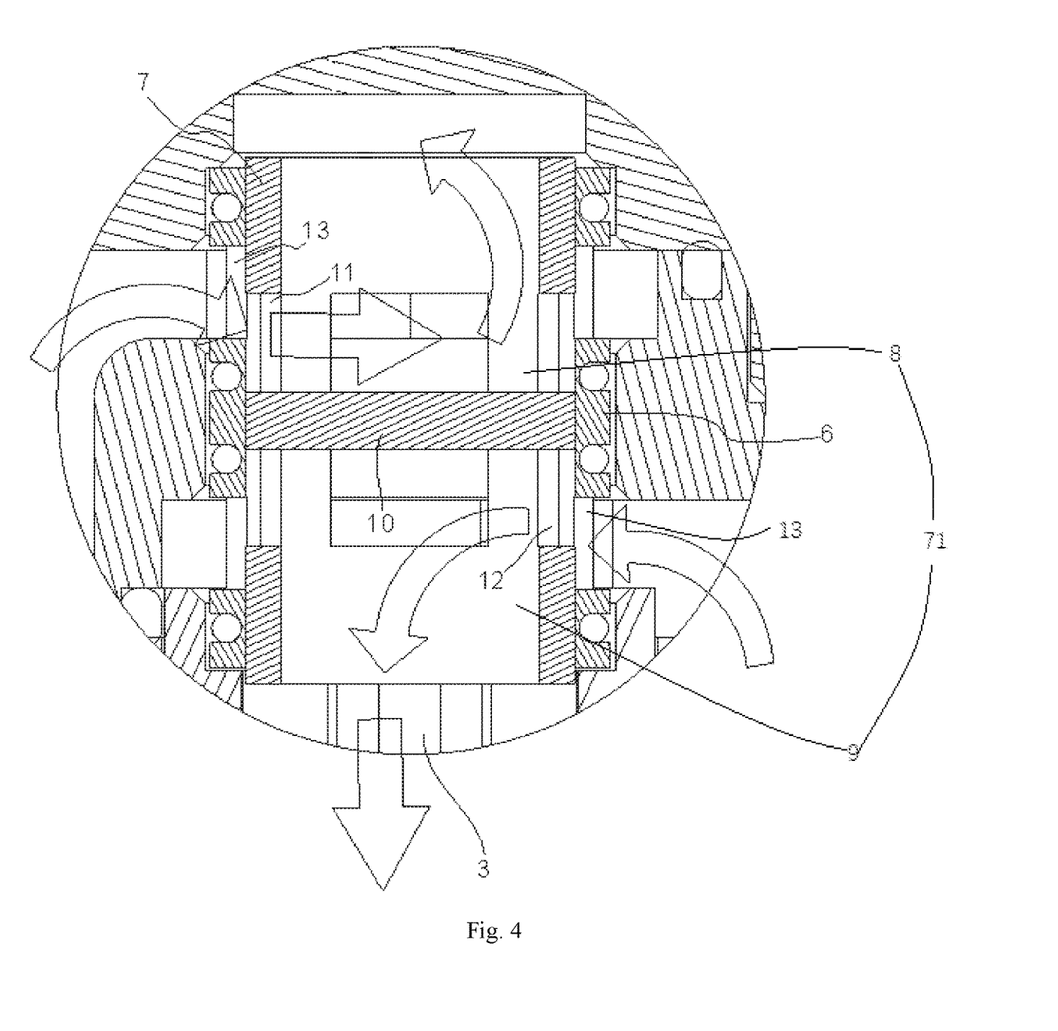
FIG. 4 is a partially enlarged sectional view showing a balancing hydraulic module according to an embodiment.
Figure 5:
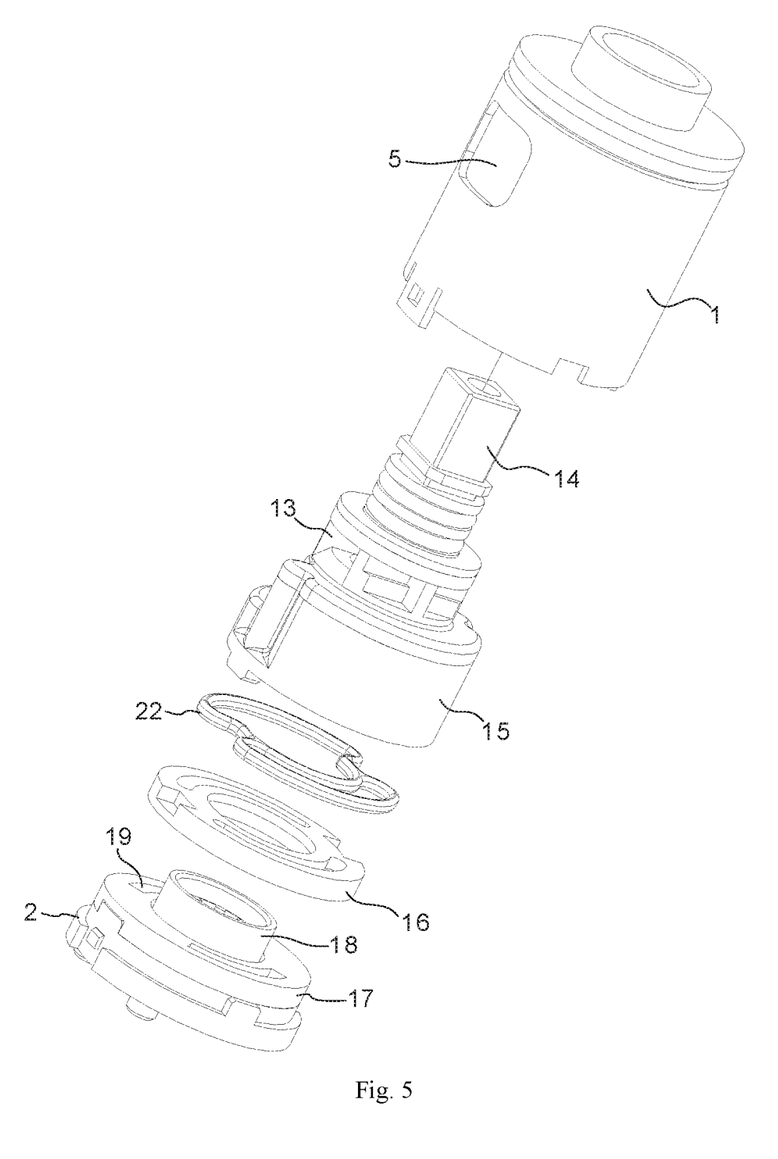
FIG. 5 is an assembly structure view showing a flow regulating module according to an embodiment.
Figure 6:
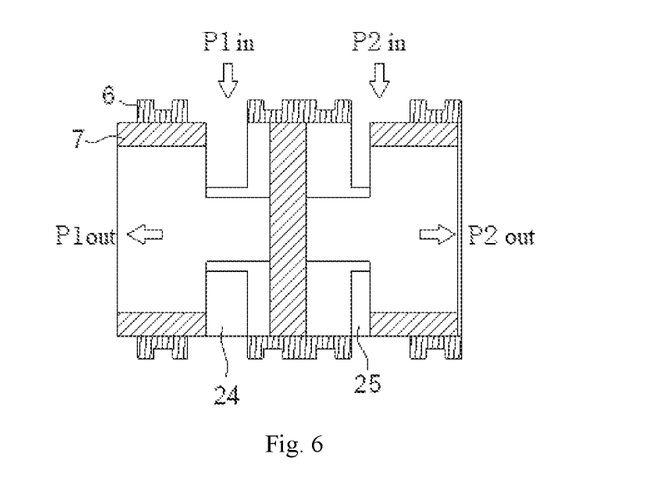
FIG. 6 is a structure view showing a balancing hydraulic module according to an embodiment.
Figure 7:
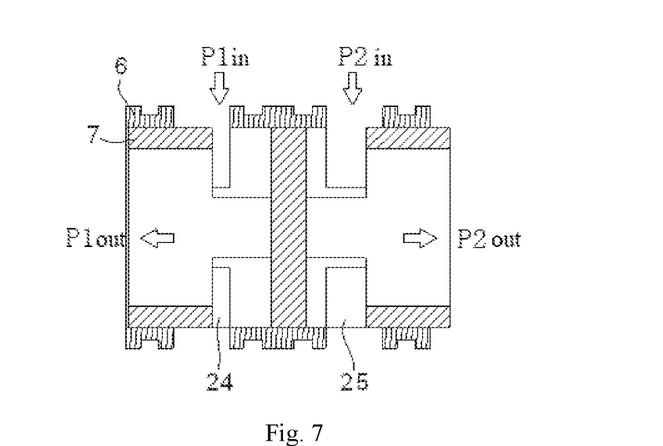
FIG. 7 is a structure view showing a balancing hydraulic module according to an embodiment.

As shown in FIG. 6, when the water inlet pressure $P1_{in} < P2_{in}$, the adjusting principle of the balancing hydraulic module is as follows. The dynamic balance sheet 7 can move to the left, the first opening gap 24 becomes larger, and the second opening gap 25 becomes smaller; and pressure attenuation can occur due to fluid passing through the gap, and the dynamic balance sheet can keep balance until meeting the condition $S*P1_{out} = S*P2_{out}$, namely the water outlet pressures on the two sides are equal, and $P1_{out} = P2_{out}$. As shown in FIG. 7, when the water inlet pressure $P1_{in}$, is greater than $P2_{in}$, the adjusting principle of the balancing hydraulic module is as follows. The dynamic balance sheet 7 can move to the right, the first opening gap 24 becomes smaller, the second opening gap 25 becomes larger, pressure attenuation can occur due to fluid passing through the gap, and the dynamic balance sheet 7 can keep balance until meeting the condition that $S*P1_{out} = S*P2_{out}$, namely the water outlet pressures on the two sides are equal, and $P1_{out} = P2_{out}$.

Preferably, as shown in FIGS. 1-5, the flow regulating module comprises a valve rod 14, a water pressure cavity housing 15, an upper switch seal 16 and a lower switch seal 17, the upper end of the valve rod 14 passes through the upper end of the valve core housing, the valve rod 14 is detachably connected with the upper end of a water pressure cavity housing 15, and the side wall of the valve rod 14 is provided with a through hole enabling the upper water passing hole 11 to be communicated with the upper water outlet 5; a boss 18 is arranged on the valve core base 18, and the middle part of the boss 18 is communicated with the bottom water outlet 3, and the upper switch seal 16 and the lower switch seal 17 are sleeved on the boss 18 from top to bottom; and the upper switch seal 16 is clamped with the water pressure cavity housing 15, the lower switch seal 17 is clamped with the valve core base 2, and the upper switch seal 16 and the lower switch seal 17 are respectively provided with two liquid inlet holes 19 symmetrically arranged. The valve rod 14 is rotated to drive the water pressure cavity housing 15 and the upper switch seal 16 clamped with the water pressure cavity housing 15; a dislocation occurs between the upper switch seal 16 and the lower switch seal 17, which can change the overlapping area between the liquid inlet holes 19 at the corresponding sides of the upper switch seal 16 and the lower switch seal 17, namely the water passing area between the upper switch seal 16 and the lower switch seal 17, and adjustment or switching of the liquid flow is realized; the opening sizes of the two overlapping areas are always the same to ensure that the cold and hot water opening areas are the same, and the rotating adjustment flow does not affect the temperature of the water outlet from the valve core; a first channel 20 and a second channel 21 are arranged in the water pressure cavity housing 15, and the first channel 20 and the second channel 21 are respectively communicated with two liquid inlet holes 19 on the upper switch seal 16; and the first channel 20, and the liquid inlet holes 19 in the upper switch seal 16 and the lower switch seal 17 communicated with the first channel 20 form a first waterway, the second channel 21 and the liquid inlet holes 19 in the upper switch seal 16 and the lower switch seal 17 communicated with the second channel 21 form a second waterway, and the two water waterways are mutually isolated.

In the embodiment, to ensure the sealing between the components, sealing gaskets 22 are arranged between the water pressure cavity housing 15 and the upper switch seal 16 and between the lower switch seal 17 and the valve core base 2, and sealing rings 23 are sleeved on the valve rod 14 and the dynamic balance sheet 7.

According to the embodiment, by optimizing the design of the valve core component of the synchronous switch, the synchronous valve core is changed from a single adjustable flow switch to a switch which is an adjustable flow switch and a synchronous switch and can simultaneously balance pressure in two channels; and this structural change makes the product assembled with the valve core changed from a complex channel to a simple channel, without the need to arrange the balance module component independently in the product; and the valve body is simple in structure, the waterway is shortened, and the cost is reduced. In addition, due to the fact that the synchronous switch valve core with voltage stabilizing function is switched on and off in a mode that two paths of channels entering the valve core are synchronously switched off, and the product assembled with the valve core does not need to be provided with a one-way check valve at the product inlet so as to overcome the defect that the one-way check valve is prone to failure.

The above mentioned are only preferred embodiments of the invention and are not intended to limit the invention. For those skilled in the art, the present invention can have various modifications and changes. Any modification, equivalent substitution and improvement made within the spirit and principles of the invention shall be covered by the protection scope of the invention.

The invention claimed is:

1. A synchronous switch valve core with pressure stabilizing function, comprising:
    a valve core housing, a valve core base, a flow regulating module, and a balancing hydraulic module;
    wherein the valve core housing is coupled with the valve core base to form a valve core cavity, the flow regulating module and the balancing hydraulic module are coaxially arranged in the valve core cavity, and water flows into the valve core cavity from one end of the valve core cavity and enters the balancing hydraulic module after passing through the flow regulating module; and a bottom water outlet and two water inlets are formed in a lower end of the valve core base, and an upper water outlet is formed in an upper side wall of the valve core housing, wherein one water inlet is communicated with the upper water outlet, and the other water inlet is communicated with the bottom water outlet.

2. The synchronous switch valve core with pressure stabilizing function according to claim 1, wherein the balancing hydraulic module is arranged in the flow regulating module, a first waterway and a second waterway are arranged in the flow regulating module, and the first waterway and the second waterway are respectively communicated with the two water inlets;
    the balancing hydraulic module comprises a static balance sheet and a dynamic balance sheet, the static balance sheet is hermetically connected with the inner cavity of the flow regulating module, and the dynamic balance sheet is hermetically and slidably connected with the inner wall of the static balance sheet; a middle part of the dynamic balance sheet is fixedly connected with a baffle plate which divides the inner cavity of the dynamic balance sheet into an upper cavity body and a lower cavity, the upper cavity body is communicated with the upper water outlet, and the lower cavity body is communicated with the bottom water outlet;
    the side wall of the upper cavity body is provided with an upper water passing hole, the side wall of the lower cavity is provided with a lower water passing hole, and the static balance sheet is provided with two through holes, one through hole enables the upper water passing hole to be communicated with the first waterway and another through hole enables the lower water passing hole to be communicated with the second waterway;
    an overlapping part of the through hole connecting the first waterway and the upper water passing hole forms an upper flow passing channel;
    and an overlapping part of the through hole connecting the second waterway and the lower water passing hole forms a lower flow passing channel, and the dynamic balance sheet moves up and down in the static balance sheet to change the water passing areas of the upper flow passing channel and the lower flow passing channel.

3. The synchronous switch valve core with pressure stabilizing function according to claim 2, wherein the flow regulating module comprises a valve rod, a water pressure cavity housing, an upper switch seal and a lower switch seal, the upper end of the valve rod passes through an upper end of the valve core housing, the valve rod is detachably connected with the upper end of a water pressure cavity housing, and the side wall of the valve rod is provided with a through hole enabling the upper water passing hole to be communicated with the upper water outlet;
    a boss is arranged on the valve core base, and a middle part of the boss is communicated with the bottom water outlet, and the upper switch seal and the lower switch seal are sleeved on the boss from top to bottom;
    the upper switch seal is coupled with the water pressure cavity housing, the lower switch seal is coupled with the valve core base, and the upper switch seal is provided with two liquid inlet holes symmetrically arranged in the center, and the lower switch seal is also provided with two liquid inlet holes symmetrically arranged in the center;
    and a first channel and a second channel are arranged in the water pressure cavity housing, and the first channel is communicated with one liquid inlet hole on the upper switch seal, and the second channel is communicated with another liquid inlet holes on the upper switch seal.

* * * * *